Dec. 21, 1948.  F. B. COLE  2,456,864
GAS FLAME REGULATOR
Filed July 24, 1945  2 Sheets-Sheet 2
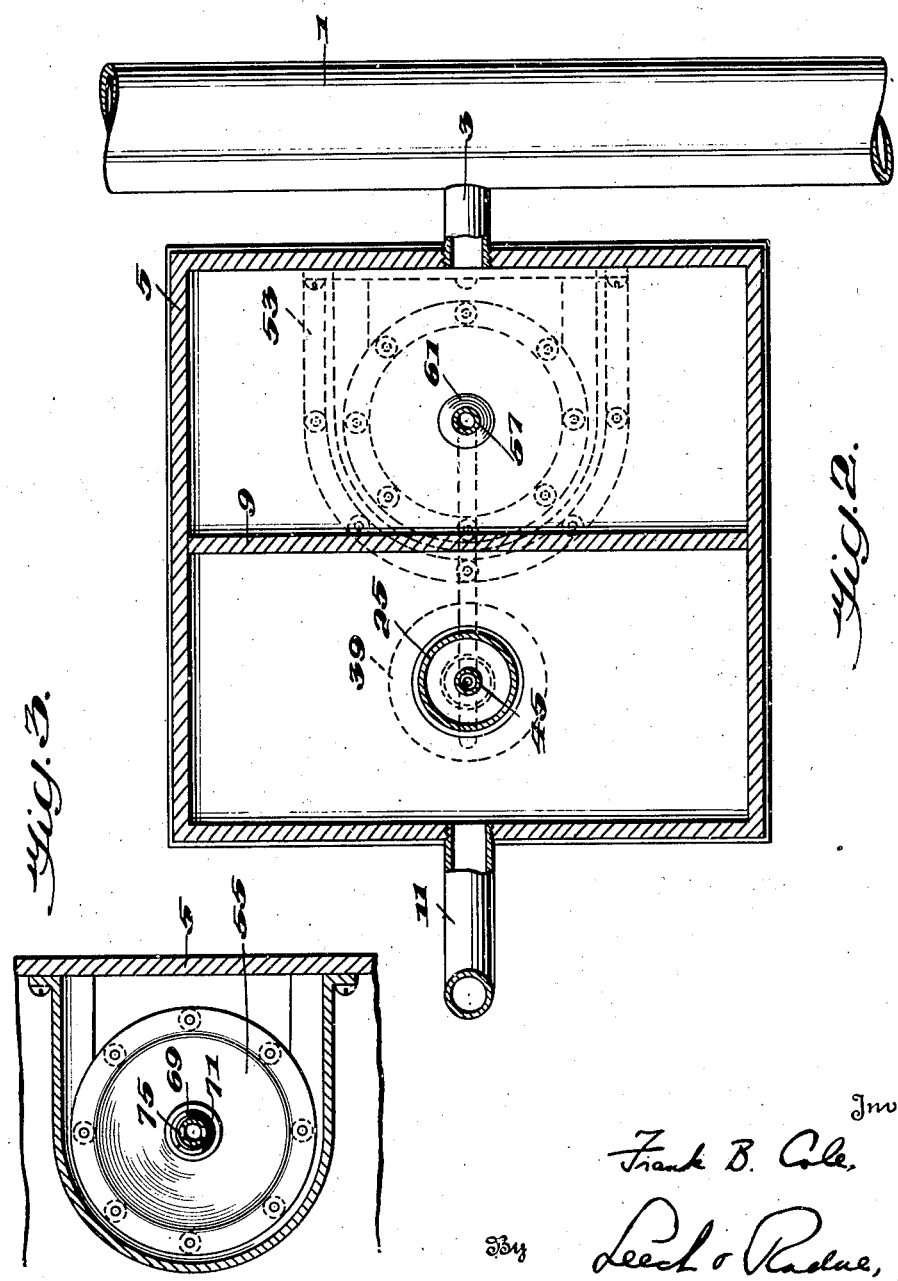
Inventor
Frank B. Cole,
By Leech & Radue,
Attorneys Patented Dec. 21, 1948

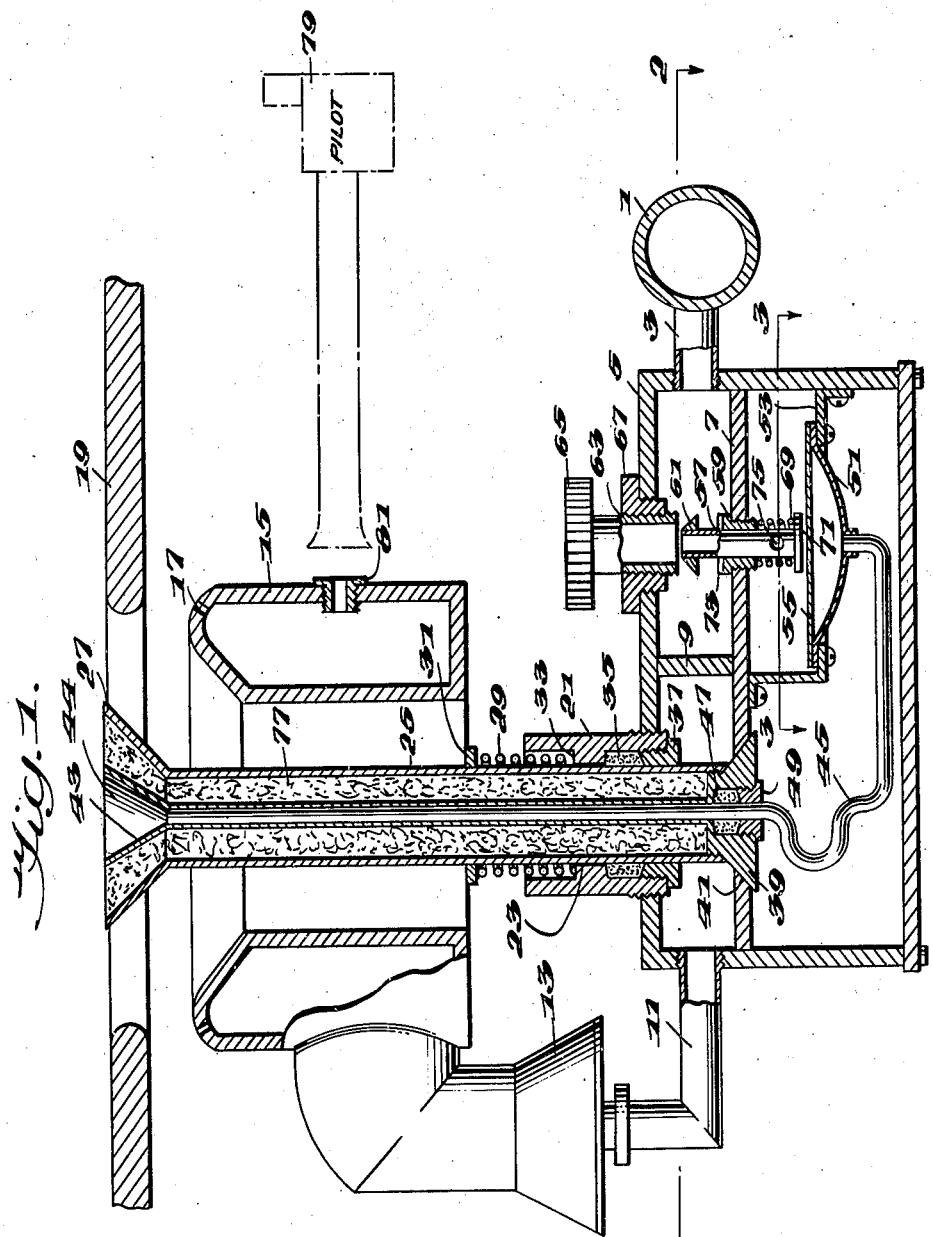

2,456,864

UNITED STATES PATENT OFFICE 2,456,864

GAS FLAME REGULATOR

Frank Bruce Cole, Asheville, N. C.

Application July 24, 1945, Serial No. 606,798

2 Claims. (Cl. 126—52)

This invention relates to a domestic gas burner and particularly to an automatically operated burner for home use wherein the placing of a cooking pan on the burner opens the main gas supply and thereafter reduces the gas supply at the time the contents of the pan reach the boiling point.

An object of the invention is to construct cooking gas burners which will initially give a large, hot flame and thereafter automatically restrict the flame so as to conserve gas and prevent the initial hot flame from continuing in operation.

A further object of the invention is to provide a thermostatic control for a domestic cooking burner which will automatically curtail the flow of gas to the burner when the material being heated reaches the boiling point. It is well known that after a pot of liquid, for instance, has been brought to the boiling point that it is desirable to curtail the gas flow so that the contents will not boil over and after the boiling point has been reached a comparatively small flame will maintain this boiling temperature.

In the drawings:

Fig. 1 is a vertical section showing the component parts of the cooking burner and the automatic and manual means for controlling the gas supply thereto;

Fig. 2 is a horizontal section taken on line 2—2 of Fig. 1, showing the gas chambers and cross-section of the main and auxiliary gas valves; and Fig. 3 is an enlarged section taken on line 3—3 of Fig. 1 through the auxiliary supply valve and illustrating the position of the thermostatic operated cut-off therefor.

Specifically in the drawings, numeral 1 indicates a gas supply pipe of the type customarily used on domestic cooking stoves for furnishing gas to a plurality of burners thereon. The gas supply from conduit 1 passes through nipple 3 into the upper portion of a suitable box or chamber 5, which in this instance is shown in rectagular form, but it will be understood that the chamber may be round, square or any other suitable configuration. The chamber 5 is divided by a horizontal partition 7 which is maintained in spaced relation from the top of the chamber 5 by baffle 9. In the side wall opposite from the gas inlet pipe 3 is a gas discharge pipe 11 having its outer end terminating in a primary air manifold 13 of conventional construction where air is added thereto and the mixture of air and gas passed to a ring-like chamber 15 having a plurality of air combustion nozzles or openings 17 arranged in the upper portion thereof and below the pan supporting grid 19. This grid 19 is of conventional construction and is of the usual open finger type used in domestic cooking stoves for supporting a pan or skillet above the burner.

Mounted through an opening in the upper wall of the gas chamber 5 is an externally screw threaded hollow bushing 21 having a centrally disposed internal peripheral flange or shoulder 23. A vertical and reciprocal central tubular member 25 is adapted to be inserted within the circular opening formed by the internal shoulder 23. The upper end of the cylindrical member 25 is preferably flared at 27 and normally projects slightly beyond the upper surface of the pan supporting grid 19, so that when a pan is placed on the grid it contacts the end of the flared portion 27 of cylindrical member 25 and the weight thereof presses the cylindrical member 25 downwardly against the tension of concentric spring 29, which is mounted between a washer or pin 31 secured to the outside of the cylindrical member 25 and the step 33 formed by the upper surface of the internal shoulder 23. To form a gas tight fit around the casing 25 a packing 35 is placed within the bushing 21 on the lower side of the internal shoulder 23 and maintained in snug sealing but non-binding relation while permitting sliding movement of the cylindrical tube 25 by a threaded bushing 37. A flared valve head disc 39 is threaded into the lower end of the tube 25 and is normally maintained in gas sealing relation against a beveled seat or opening 41 formed in the horizontal partition plate 7, by the upward action of spring 29.

An inner, centrally positioned tube of reduced diameter indicated by numeral 43 and having an upwardly co-extensive flared end is affixed to the upper surface of the valve head 39 and extends throughout member 25. Within this inner flared tube 43 a sealed end soft metal or flexible capillary tube 45 is mounted and maintained in position by packing 47 and threaded bushing 49. This inner capillary tube 45 including the upper enlarged bulbous end 44 filling the flared portion contains mercury or other expansive fluid and is constructed of material of such ductility that its lower unrestrained portion will readily flex and follow the movement imparted to central cylindrical casing 25 when the casing is depressed. The opposite end of the capillary or mercury filled tube 45 terminates within a dish-shaped plate 51 which is held in horizontal position by brackets 53 bolted to the horizontal partition 7 and side wall of the casing 5. The capsule or container provided by plate 51 has a flexible diaphragm or cover 55 secured to the plate so that upon expansion of the mercury or other fluid within the capillary pipe 45 the flexible diaphragm 55 will be bowed or expanded outwardly. The dish-shaped plate 51 and the flexible diaphragm 55 function as a diaphragm motor. Mounted above the center of the diaphragm 55 is a hollow valve stem 57 inserted through a threaded bushing 59 in horizontal partition 7. The hollow valve stem 57 has an open tapered sealing head or disc 61 thereon for engagement with the lower edge of screw threaded nipple 63 carried by hand set knob 65 threaded through threaded flange 67 also threaded into an opening in the upper wall of casing 5. The hollow valve stem 57 is normally maintained in fully open position through the medium of outer concentric spring 69 bearing against a lower flange 71 affixed to the end of the valve stem and pressing against the lower end of threaded bushing 59. This downward movement is limited by a pin or washer 73 secured to the outer surface of the hollow valve stem 57, and abuts the upper surface of the threaded bushing 59. A plurality of gas discharge outlets 75 are provided in the hollow valve stem below the horizontal partition 7.

The subdivided chamber 5 provides a gas inlet chamber supplied by the nipple 3, a gas outlet chamber connected by the pipe 11 and manifold 13 to the combustion ring 15, and an intermediate chamber passing gas received from the hollow valve stem 57 to the valve disc 39.

To protect and insulate the bulbous end 44 of the mercury tube 45, the space between the inner tube or casing 43 and the outer tube or casing 25 is preferably backed with mineral wool or other heat insulating material 77, so that the capillary tube 45 will not be subjected to the intense heat created by the gas openings 17 but only the enlarged end 44 will receive radiant heat energy from the bottom of the cooking vessel, whereupon the fluid in the mercury tube will expand and bow upward the flexible diaphragm 55 of the capsule 51, and force the hollow valve stem 57 upwardly into partially restricted relation with the depending nipple 63 to control but not close off the flow of gas as the nipple 63 has been adjusted to prevent this.

In operation the gas supply in manifold 1 passes through conduit 3 into the upper portion of the gas chamber 5. Then, upon manipulation of the end knob 65 to remove nipple 63 from its sealing engagement with the valve head 57, if the knob 65 has been previously turned down all the way, gas will pass into the chamber and through the same until its flow is blocked by main gas valve 39. If desired, however, this gas valve assembly, 63—65, may be left in open adjusted position and the gas controlled from gas line 1 into the casing 5 by inserting a suitable valve (not shown) in inlet pipe 3. After a cooking receptacle is placed on the grid 19, its weight against the upper flared end 27 will open the valve 39 and permit the gas to flow therethrough and out through gas discharge pipe 11 into the air intake manifold 13, whereupon the mixture of air and gas will flow into the ring burner casing 15 and outwardly through orifices 17 and strike the bottom of the pan resting on the grid 19. A suitable pilot with a snap valve is shown diagrammatically at 79 for initially igniting a small flow of gas mixture which passes out of hollow bushing 81, and this pilot flame will propagate and ignite the main supply of gas flowing through openings 17. It will be appreciated that when the valve 39 is initially actuated there is a comparatively large amount of gas flowing through the burner and consequently a voluminous and hot flame is generated below the receptacle. As the contents thereof rise in temperature radiant heat from the bottom of the cooking vessel will influence the mercury in bulb 44 to increase its temperature and increase the volume of the mercury or other fluid in the bulb 44 and central flexible pipe 45. The volume of the fluid is such that at approximately the time the contents of the cooking receptacle reaches the desired cooking point enough heat will have been absorbed by the bulb 44 to increase the fluid volume thereof. This occurs to such an extent that pressure will be created in the capsule formed by plate 51 to expand or bulge the diaphragm 55 and contact the lower end of the auxiliary valve 61 to force the same upward to restrict the flow of gas passing therethrough. The initial volume of gas is controlled by manipulation of the valve operator 65 so that it is a comparatively simple matter for the operator to adjust the auxiliary valve flow to restrict the flow of gas therethrough but still permit sufficient gas to come through to keep the contents of the receptacle boiling, and thus no gas is wasted and the cooking receptacle is kept at a sufficiently high temperature to accomplish the proper cooking purposes.

I claim:

1. In a domestic gas burner, a perforated circular combustion chamber, a cooking pot supporting grid positioned in spaced relation above the said combustion chamber, a normally closed reciprocable valve controlling the flow of gas to said combustion chamber, said valve having a tubular stem passing through the circular combustion chamber and extending above the supporting grid whereby the stem and valve thereon are depressed and the valve opened when a pot is placed on the said grid, a second normally open valve arranged in spaced relation to the first mentioned valve and controlling the flow of gas to the first mentioned valve, a heat responsive expansive fluid containing chamber positioned to move the second mentioned valve toward closed position when the fluid therein increases in volume, and a flexible, expansible fluid filled tube communicating with the said expansive fluid containing chamber and extending throughout the length of the said tubular stem in such a manner that the upper end of said tube is subjected to radiant heat from the bottom of a cooking pot on the supporting grid.

2. A gas burner as defined in claim 1 wherein the flexible, expansible fluid filled tube is provided with an enlarged end portion and the major part of the tube is centrally mounted in said hollow stem and surrounded by heat insulating material whereby only the enlarged end portion is influenced by the heat transmitted from the bottom of the cooking vessel.

FRANK BRUCE COLE.

REFERENCES CITED

The following references are of record in the file of this patent:

UNITED STATES PATENTS

| Number | Name | Date |
| --- | --- | --- |
| 792,096 | Wentworth | June 13, 1905 |
| 854,202 | Effert | May 21, 1907 |
| 947,914 | Junkers | Feb. 1, 1910 |
| 1,194,029 | Hercher | Aug. 8, 1916 |
| 1,201,469 | James | Oct. 17, 1916 |
| 1,291,814 | Erikstrup | Jan. 21, 1919 |
| 1,945,387 | Vedoe | Jan. 30, 1934 |
| 2,234,550 | Bridgemen | Mar. 11, 1941 |
| 2,402,997 | Grayson | July 2, 1946 |